July 23, 1957  O. LOTZ ET AL  2,800,091
CYCLONE FURNACE

Filed Feb. 6, 1952  2 Sheets-Sheet 1

INVENTORS
OTTO LOTZ
EWALD SCHINDLER
MAX SCHNELLE
BY
*JPMoran* ATTORNEY

July 23, 1957  O. LOTZ ET AL  2,800,091
CYCLONE FURNACE

Filed Feb. 6, 1952  2 Sheets-Sheet 2

INVENTORS
OTTO LOTZ
EWALD SCHINDLER
MAX SCHNELLE
BY
ATTORNEY

2,800,091
Patented July 23, 1957

United States Patent Office

2,800,091
CYCLONE FURNACE

Otto Lotz and Ewald Schindler, Oberhausen, and Max Schnelle, Dusseldorf, Germany, assignors to The Babcock & Wilcox Company, Jersey City, N. J., a corporation of New Jersey Application February 6, 1952, Serial No. 270,256

8 Claims. (Cl. 110—28)

The present invention relates to fuel burning apparatus and more particularly to the construction and operation of a cyclone type furnace for burning ash-containing solid fuels whereby, with fuel supplied to the furnace in relatively coarsely pulverized or granular condition, the combustion is accompanied by a high rate of heat release per cubic foot of furnace volume so as to maintain furnace chamber temperatures above the ash fusion temperature and thereby permit the removal of ash as a liquid slag. The solid fuels normally used in such furnaces are initially crushed or otherwise reduced to a relatively coarsely pulverized or granular condition so as to provide particle sizes of ⅜″ and under, together with a proportion of dustlike particles known as "fines."

In the operation of cyclone furnaces in general, as disclosed for example in U. S. Patent No. 2,357,301, the reduced fuel and preheated air are introduced tangentially into a combustion chamber of generally cylindrical formation so as to maintain a whirling stream of fuel and air which travels in helical path along and against the inner circumferential wall of the furnace. The entering fuel and air stream is rapidly ignited and the centrifugal effect of the whirling stream causes the ash particles released from the burning fuel particles to deposit in a molten condition on the furnace wall and form a film or layer of molten slag thereon on which the larger fuel particles are caught and burned. Additional air, known as secondary air, is usually introduced tangentially, at a location intermediate the ends of the furnace, so as to merge with the burning stream of fuel and primary air. The combustible constituents of the fuel burn with a high rate of heat release, and with the development of temperatures above the fusing temperature of the ash, whereby the fuel is rapidly reduced to gaseous products of combustion which are discharged from the furnace through a central throat passage, and to molten slag which drains through a lower slag outlet.

Thus, in a cyclone furnace of the type shown in the aforesaid patent, with its longitudinal axis approximately horizontal, the entering jet of secondary air must draw the liquid slag in spirals over the uppermost part of the combustion chamber in order to provide a continuous film of slag to which the fuel particles may adhere and thus be swept by the helically moving air stream from which a continuous supply of new oxygen is obtained. Owing to the force of gravity, the slag and fuel tend to move toward the lowermost point within the cyclone chamber. The cylindrical formation of liquid slag on the cooled combustion chamber wall will therefore have the greatest wall thickness at the bottom of the chamber. This is advantageous for tapping the liquid slag at this point. However, there is always a risk that fuel will accumulate at this point, that is, loose flying coke particles at first, which in the case of baking coal, due to the continued impingement of molten coal particles, tends to bake together to form a coke cake which then grows in the form of a horn or island which extends toward the location of fuel introduction. When the disturbance has advanced that far, the coke island hinders the development of the torsion, or centrifugal movement of the fuel-air stream; and, as a result, the flame scatters, and incompletely burned fuel races into the adjoining heating chamber or chambers where it causes slag difficulties. The slag under the coke island solidifies due to the heat transmission to the fluid-cooled cyclone furnace jacket and due to the shielding against irradiation by the coke island. This initiates the freezing-in of the cyclone furnace, because the cyclone furnace cools at a rate which is generally proportionate to the distance at which the combustion is displaced from the cyclone chamber into the succeeding heating space or spaces. As a result, the coke and solid slag would continue to accumulate and thus obstruct both the slag and gas discharge openings. Similar conditions also result from the use of fuels having ash components of high specific gravity, meltable or non-meltable, which also tend to form a solid island in the slag bed.

The methods by which the foregoing difficulties may be obviated are subject to considerable limitation due to the small resources which are available. Firstly, the quantity of total air required for complete combustion is determined by the heating value of the fuel. Thus, for a given fuel, since total air quantity is fixed, the only quantitative adjustment available is to vary the relative proportions of primary air and secondary air. As is already known, the leaner fuels require a relatively small quantity of air for ignition, and specifically, hot air; whereas the richer fuels require a relatively greater quantity of air for ignition, although of lower temperature than for leaner fuels. If different fuels are to be fired in the same furnace, it is advisable to admix hot waste gases to the primary air for the leaner fuel, since each fuel-and-air stream requires a certain minimum gaseous fluid content to attain the injection velocity desired.

The maximum effect, however, can be obtained through the medium of the proportionately greater amount of secondary air which is required. If the secondary air is admitted in the ascending portion of the helical solid fuel-and-air path, its effect on the sump will be small. The effect of the secondary air becomes the greater the closer it approaches the sump. For the development of the jet, however, a certain distance from the air discharge nozzle is necessary. The secondary air nozzles are therefore preferably arranged so as to open only into an upper region of the chamber, above the central longitudinal axis, and to discharge into an upper quadrant of the chamber in a direction corresponding to the descending portion of the primary air-fuel path. An especially favorable effect is obtained when a plurality of nozzles are circumferentially spaced in a common transverse plane, at right angles to the central longitudinal axis, and thus are arranged one behind the other. With this arrangement of nozzles, the issuing streams of air from the respective nozzles deflect one another, so that several helical bands are formed lying side by side. It is preferable, therefore, to offset the nozzles in relation to each other in the axial direction so as to direct the streams into successive portions of a single helical line. However, with this latter formation of the air currents it may be difficult to bring the fuel into contact quickly with sufficient air. It is most desirable, therefore, to provide a fuel admission means centrally of and within each air admission means. With this last mentioned arrangement, the formation of coke islands can best be avoided.

The various features of novelty which characterize our invention are pointed out with particularity in the claims annexed to and forming a part of this specification. For a better understanding of the invention, its operating advantages and specific objects attained by its use, reference should be had to the accompanying drawings and descriptive matter in which we have illustrated and described selected embodiments of the invention.

Figure 2:
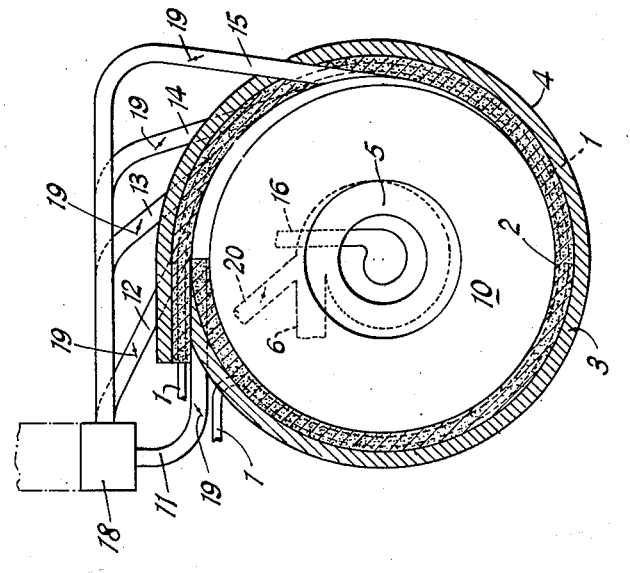
Fig. 2 is an end sectional view of Fig. 2 taken along line 2—2.
Figure 1:
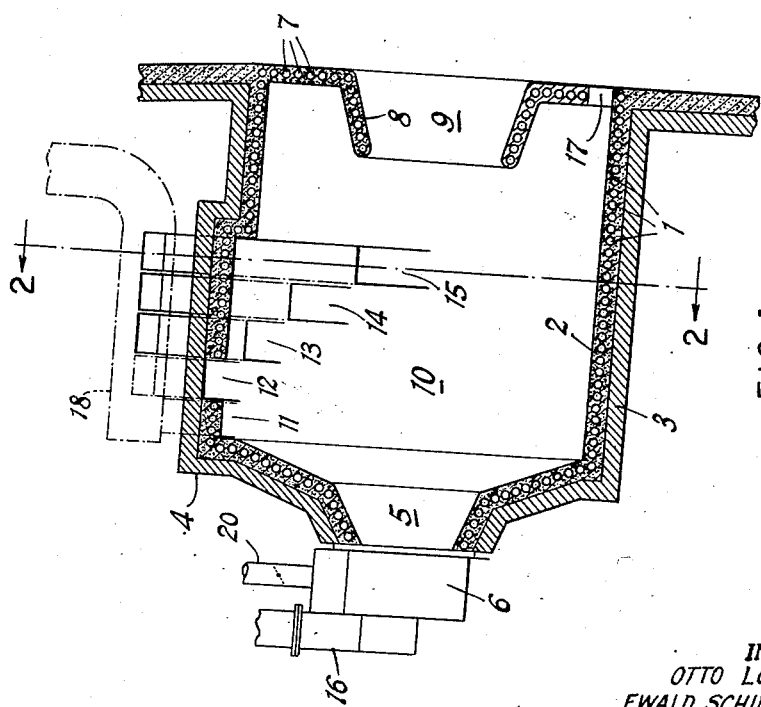
Fig. 1 is a side sectional view of a cyclone furnace constructed in accordance with our invention.

The cyclone furnace illustrated in Fig. 1 and Fig. 2 is essentially a horizontally inclined cylinder of fluid cooled construction and, except for certain specific features hereinafter described, is of the general type disclosed in U. S. Patent Bailey et al., 2,357,301, September 5, 1944. The enclosing walls of the cyclone furnace include a cylindrical cooling tube jacket 1 which surrounds the combustion chamber 10 and which is covered on the fire side with a refractory composition 2 and outwardly with an insulating layer 3 and a sheet jacket or casing 4. One end of the furnace narrows outwardly in the form of a frustum to a conically formed fuel inlet or primary burner section 5 to which a whirling stream of solid fuel particles suspended in primary air is supplied at high velocity through a tangentially directed air-fuel conduit 6, substantially as disclosed in the aforesaid patent. An auxiliary supply of air may be admitted tangentially of burner section 5 from conduit 16.

The opposite end boundary of the furnace is formed by a flat fluid cooled wall 7 having a centrally arranged frustum-shaped portion 8 which projects inwardly of chamber 10 so as to define an outwardly flaring gas outlet passage 9 through which the furnace gases are discharged. A slag outlet 17 is formed in a lower portion of wall 7.

At a location adjacent the fuel inlet end of chamber 10, provision is made for admitting secondary air to chamber 10 through a series of separate nozzles 11, 12, 13, 14, and 15 which open tangentially into chamber 10 at circumferentially distributed positions within an upper quarter segment of the furnace enclosure, at intervals ranging from about twenty to thirty degrees, and wholly to one side of a vertical plane containing the central longitudinal axis whereby a whirling movement of the total air-fuel stream is maintained along and against the surrounding circumferential wall, substantially as disclosed in Bailey et al. The nozzles are conveniently of rectangular cross section, and, in the form shown, are arranged in side by side relation longitudinally of the chamber, and suitably connected at their outer ends to a secondary air supply conduit or header 18. All nozzles are thus arranged to discharge into the chamber at elevations above the central axis and furthermore in a direction coinciding generally with the downward movement of primary air and fuel along the wall of chamber 10. The nozzles 11 to 15 inclusive are positioned so as to open into chamber 10 on a helical line connecting their centers and thus on an anticipated current line along which the stream of secondary air will flow in passing through the chamber. Pivoted dampers 19 may be installed as indicated to provide a means for separately controlling the discharge of air through the respective nozzles 11—15. When a lean fuel is to be burned in the furnace, the supply of primary air may be supplemented by hot waste gases which are admitted, for example, in regulable quantity, through a valved conduit 20 connected to the primary air-fuel chamber 6, as indicated.

Figure 4:
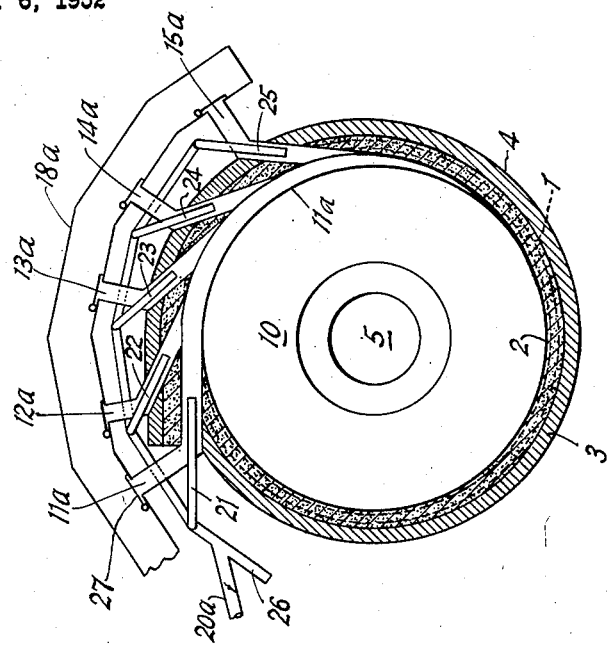
Fig. 4 is an end sectional view of Fig. 3 taken along line 4—4.
Figure 3:
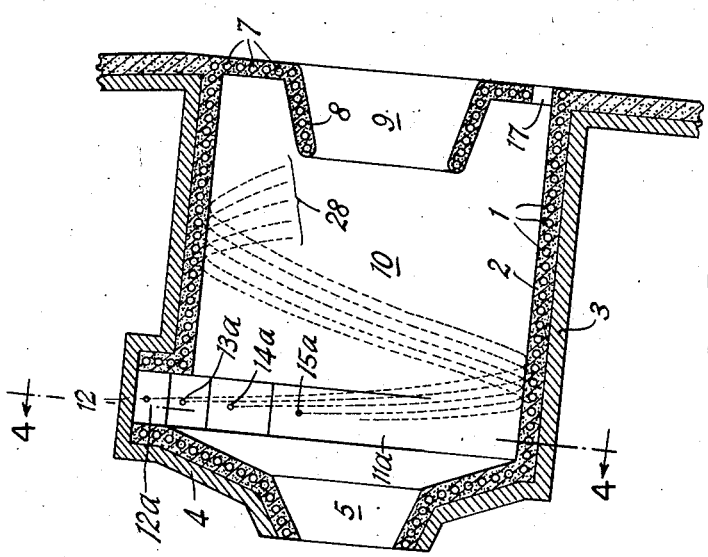
Fig. 3 is a side sectional view similar to Fig. 1, showing a modification.

In a modification of our invention, as illustrated in Figs. 3 and 4, the variation is provided in part by the novel arrangement of secondary air nozzles 11a, 12a . . . and 15a which open tangentially into chamber 10 and which are circumferentially distributed in a single transverse plane at right angles to the length of the chamber. In addition, each secondary air admission nozzle 11a, 12a . . . 15a is fitted with a primary air-fuel discharge pipe or nozzle of the series 21 to 25 inclusive, arranged concentrically of and within the respective air nozzles, and discharging into the respective air nozzles at positions outwardly spaced from the inner wall surface of chamber 10. Each of the nozzles 21 to 25 inclusive is formed as a branch of the primary air-fuel supply pipe 26 to which it is connected. Similarly, each of the secondary air nozzles 11a to 15a inclusive is formed as a branch of the secondary air supply header 18a to which it is connected. As indicated in Fig. 4, separately operable valves 27 are mounted over the inlet ends of the respective nozzles 11a to 15a inclusive for regulating the relative quantities of secondary air discharged through individual nozzles. When burning a lean fuel, the fluid content of the primary air-fuel stream may be augmented by hot waste gases admitted through a valved conduit 20a connected to the primary air-fuel pipe 26.

The broken lines 28 (Fig. 3) represent the helical current bands along which the respective fuel-air streams are normally caused to flow upon release from the respective nozzles 21 to 25 inclusive. As will be noted, these bands lie alongside one another and thus make it possible to conveniently arrange the nozzles in a common plane, as shown, without interference of one such stream with another. It will be understood that in this form of the invention, the tapered end section 5 of chamber 10 may be closed off, or merely an auxiliary air conduit 16 installed, since the primary air-fuel conduit 6 of the former embodiment is supplanted by the special provision for introducing the fuel through secondary air ports, and thereby provide a means for best avoiding the formation of slag islands within the furnace, as hereinbefore described.

While in accordance with the provisions of the statutes we have illustrated and described herein the best form of the invention, and its mode of construction now known to us, those skilled in the art will understand that changes may be made in the form of the apparatus disclosed without departing from the spirit of the invention covered by the claims, and that certain features of the invention may sometimes be used to advantage without a corresponding use of the other features.

We claim:

1. Apparatus for burning a slag forming solid fuel which comprises a substantially cylindrical combustion chamber formed about a horizontally arranged longitudinal axis and having a gas outlet opening from an end region thereof, means for introducing said fuel suspended in primary air in streams into an opposite end region of said chamber and effecting a helical path of travel therein at a high angular velocity along the circumferential wall of said chamber toward said gas outlet end region, said means including a group of circumferentially spaced fuel admission nozzles opening toward the interior of said chamber in tangential relation to the inner wall surface thereof and terminating in discharge ends outwardly spaced from said inner wall surface, means for introducing the major portion of air required for combustion of said fuel comprising a group of secondary air inlet nozzles opening tangentially into said chamber at circumferentially successive positions confined to elevations above said axis where the direction of travel of the fuel and air mixture along said wall surface is downward, said fuel admission nozzles being arranged respectively within said air inlet nozzles in spaced relation thereto, and a slag outlet opening from a lower portion of said gas outlet end region.

2. Apparatus for burning a slag forming solid fuel as defined in claim 1 and further characterized by said air and fuel nozzles opening into said chamber in a substantially common plane disposed transversely of said longitudinal axis.

3. Apparatus for burning a slag-forming solid fuel which comprises stationary wall means defining a combustion chamber of substantially cylindrical formation about a substantially horizontal longitudinal axis, said wall means including a circumferential wall extending substantially throughout the length of said chamber and surrounding a gas outlet opening from an end region of said chamber, means for continuously introducing a mixture of said solid fuel with primary air into an opposite end region of said chamber and effecting a helical path of travel of said mixture therein at a high angular velocity along and against said circumferential wall toward said gas outlet end region, means including ports formed in said circumferential wall for introducing secondary air into said chamber to provide the major portion of air required for combustion, said secondary air ports being arranged in a single group axially removed from said gas outlet and opening tangentially into an outer circumferential region of said chamber at circumferentially successive positions along said helical path of travel of the primary air-fuel mixture for effecting a common direction of travel of said secondary air therewith, said ports being restricted to a minor segment portion of the chamber circumference at the upper side of said axis where the direction of travel of said mixture along said wall is downward, and a slag outlet opening from a lower portion of said gas outlet end region.

4. Apparatus for burning a slag-forming solid fuel which comprises stationary wall means defining a combustion chamber of substantially cylindrical formation about a substantially horizontal longitudinal axis, said wall means including a circumferential wall extending longitudinally of the chamber and surrounding a gas outlet opening from an end portion of said chamber, means for continuously introducing a mixture of said solid fuel with primary air into an opposite end portion of said chamber and effecting a helical path of travel of said mixture therein at a high angular velocity along and against said circumferential wall toward said gas outlet end portion, means including ports formed in said circumferential wall for introducing secondary air to provide the major portion of air required for combustion, all of said air ports being arranged in a single group adjacent to the location at which said primary air and fuel mixture is introduced and opening tangentially into said chamber in circumferential succession along said helical path of travel of the primary air-fuel mixture and solely into an outer circumferential region at the upper side of said axis wherein the direction of said travel in successive convolutions of said path is downward along said wall, and a slag outlet opening from said gas outlet end portion of said chamber.

5. Apparatus for burning a slag forming solid fuel as defined in claim 3 and further including means for augmenting the fluid content of said primary air-fuel mixture prior to introduction into said chamber which comprises means for including in said mixture a regulable proportion of hot waste gases.

6. Apparatus for burning a slag forming solid fuel as defined in claim 4 and further including means for admixing hot waste gases to said primary air-fuel mixture prior to introduction of said mixture into said chamber.

7. Apparatus for burning a slag forming solid fuel as defined in claim 4 and further characterized by said secondary air admission ports being confined to an upper quarter segment of said wall and all said ports opening into said chamber at one side of the vertical plane containing said longitudinal axis.

8. Apparatus for burning a slag forming solid fuel as defined in claim 4 and further characterized by said secondary air admission ports being arranged at axially successive positions and opening into said chamber at progressively decreasing elevations above said axis at progressively increasing distances from said fuel inlet end portion of said chamber.

References Cited in the file of this patent

UNITED STATES PATENTS

| 1,762,505 | Burg | June 10, 1930 |
| 2,357,301 | Bailey et al. | Sept. 5, 1944 |
| 2,368,827 | Hanson et al. | Feb. 6, 1945 |
| 2,395,103 | Clausen et al. | Feb. 19, 1946 |

FOREIGN PATENTS

| 297,345 | Great Britain | Sept. 17, 1928 |
| 471,330 | Germany | Feb. 11, 1929 |
| 518,173 | Germany | Nov. 24, 1931 |
| 207,327 | Switzerland | Oct. 31, 1939 |